US012763625B2

(12) United States Patent
Schmitt et al.

(10) Patent No.: US 12,763,625 B2
(45) Date of Patent: Oct. 13, 2026

(54) ELECTRICAL INSULATING ELEMENT FOR STATOR, AND ASSOCIATED STATOR, ELECTRIC MACHINE, SENSOR AND AIRCRAFT

(71) Applicant: SAFRAN ELECTRONICS & DEFENSE, Paris (FR)

(72) Inventors: Matthieu Schmitt, Moissy Cramayel (FR); Bernard Rabret, Moissy Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 203 days.

(21) Appl. No.: 18/714,959

(22) PCT Filed: Nov. 29, 2022

(86) PCT No.: PCT/FR2022/052192

§ 371 (c)(1),
(2) Date: May 30, 2024

(87) PCT Pub. No.: WO2023/099838

PCT Pub. Date: Jun. 8, 2023

(65) Prior Publication Data

US 2025/0047158 A1 Feb. 6, 2025

(30) Foreign Application Priority Data

Dec. 3, 2021 (FR) ...................................... 2112960

(51) Int. Cl.
*H02K 3/34* (2006.01)
*H02K 1/16* (2006.01)

(52) U.S. Cl.
CPC ............... *H02K 3/345* (2013.01); *H02K 1/16* (2013.01)

(58) Field of Classification Search
CPC ............. H02K 3/345; H02K 1/16; H02K 3/34
See application file for complete search history.

(56) References Cited

U.S. PATENT DOCUMENTS

| | | | | |
|---|---|---|---|---|
| 6,342,740 | B1 | 1/2002 | Mabuchi | |
| 2015/0214804 | A1 | 7/2015 | Katsuragi et al. | |
| 2019/0190343 | A1* | 6/2019 | Han | H02K 5/22 |
| 2021/0296975 | A1* | 9/2021 | Hino | H02K 15/02 |

FOREIGN PATENT DOCUMENTS

| | | |
|---|---|---|
| JP | 2014093893 A | 5/2014 |
| JP | 2016096597 A | 5/2016 |

OTHER PUBLICATIONS

International Application No. PCT/FR2022/052192, International Search Report and Written Opinion, Feb. 8, 2023, 13 pages (2 pages of English translation and 11 pages of original document).

* cited by examiner

*Primary Examiner* — Thomas Truong
(74) *Attorney, Agent, or Firm* — Kilpatrick Townsend & Stockton LLP

(57) ABSTRACT

The electrical insulating element for a stator comprising a stack of magnetic sheets having at least one first stator tooth and comprising at least one first stator coil wound around the first stator tooth, the first stator tooth having a first end face located at one end of the stack of magnetic sheets, the insulating element comprises an electrically insulating foil having a face coated with adhesive.

10 Claims, 4 Drawing Sheets

[Fig 1]
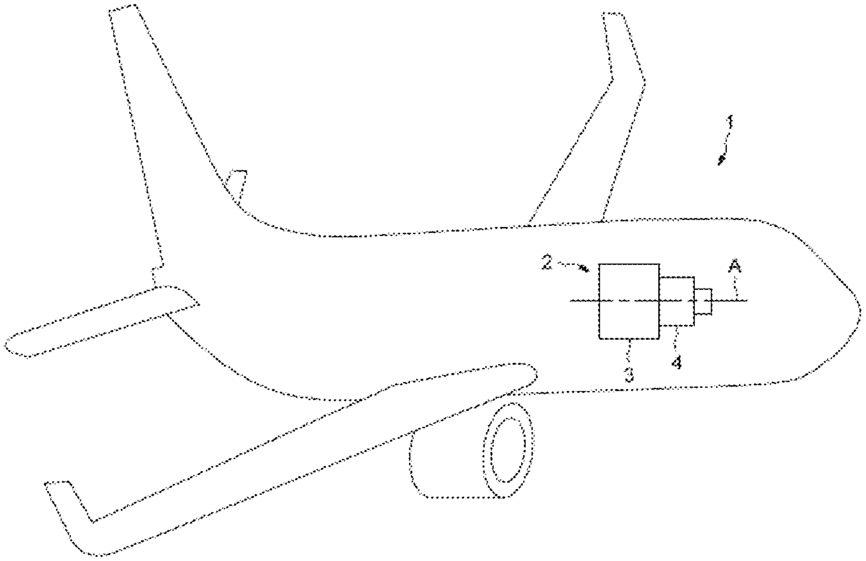
[Fig 2]
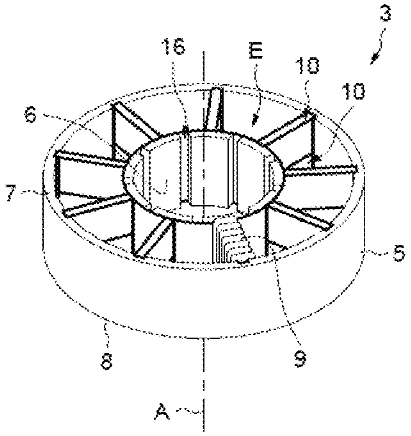

[Fig 3]
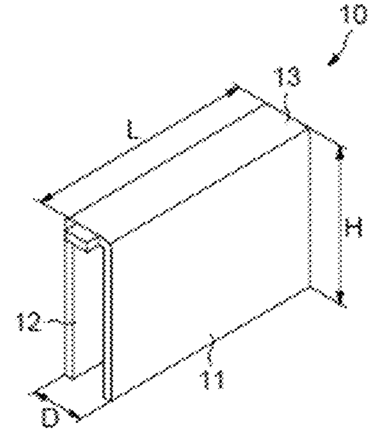
[Fig 4]
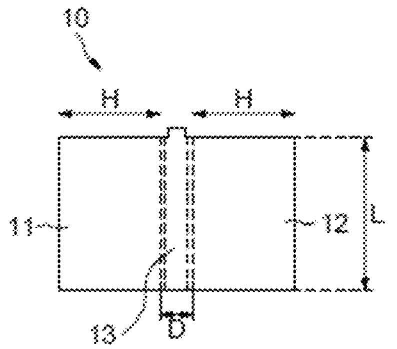
[Fig 5]
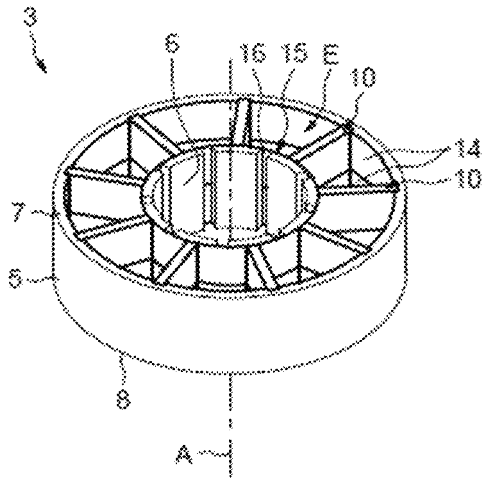

[Fig 6]
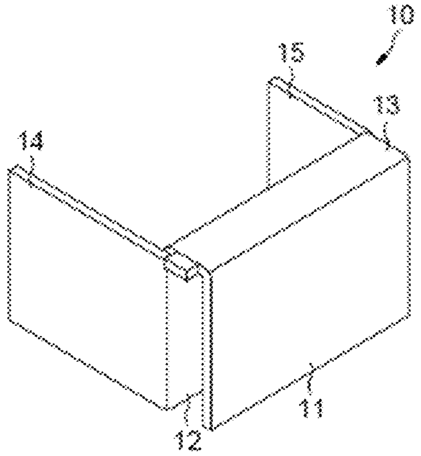
[Fig 7]
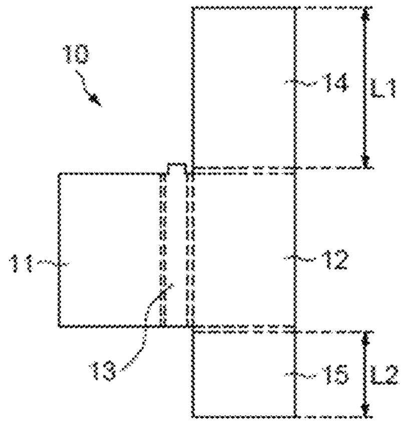
[Fig 8]
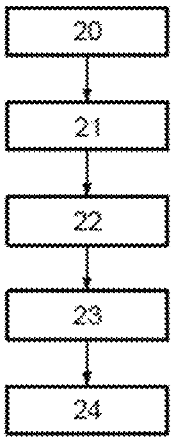

[Fig 9]
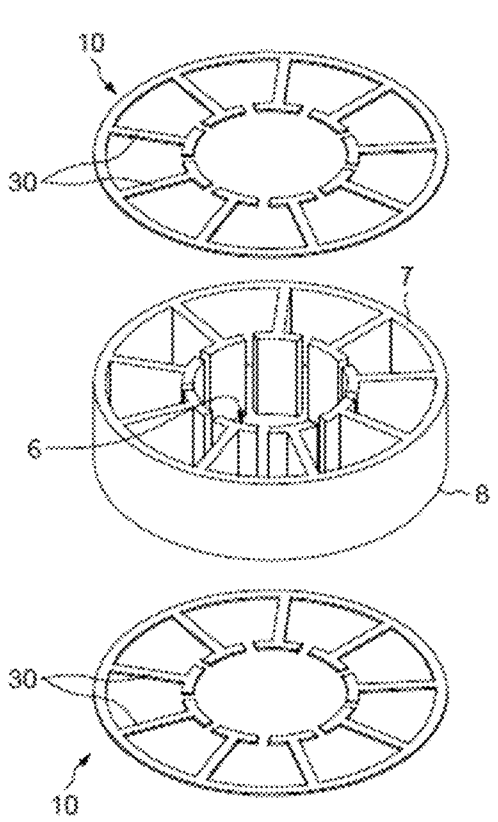
[Fig 10]
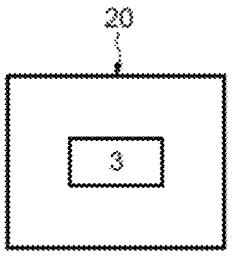

ELECTRICAL INSULATING ELEMENT FOR STATOR, AND ASSOCIATED STATOR, ELECTRIC MACHINE, SENSOR AND AIRCRAFT

TECHNICAL FIELD OF THE INVENTION

The invention relates to the electrical insulation of electrical assemblies comprising a wound stator, and more particularly of electric machines and sensors.

The invention relates more particularly to an electrical insulating element for a stator, a stator comprising such an insulating element, and a rotating electric machine and a sensor comprising such a stator.

PRIOR ART

Generally, when producing a stator for a rotating electric machine or for a sensor, for example of the resolver type, it is necessary to pack the stator coils wound around the stator teeth of the magnetic mass of the stator to reduce the bulk of the stator.

In order to guarantee satisfactory electrical insulation between the magnetic mass and the stator coils, the faces located at the ends of the magnetic mass in a longitudinal direction of the stator are enameled.

The end faces are enameled for example by electrostatic powder coating.

However, enameling by electrostatic powder coating requires substantial industrial resources to bake the magnetic mass covered with powder.

Furthermore, electrostatic powder coating requires protective means to prevent the diffusion and inhalation of the powder by operators.

In addition, compaction of the stator coils can crack and peel the enamel, damaging the electrical insulation of the stator.

The fragments can further diffuse into the stator and damage the stator and a rotor housed in the stator during rotation of the rotor.

Document FR 2986385 discloses an insulated electric motor used in a flammable environment, including stator cavities.

Each cavity is filled with an adhesive material disposed in the cavity and a filler substance adhered to the adhesive material.

Reference can also be made to document WO 2018/131703 which discloses a stator for a rotating electric machine including notches including stator coils.

The notches are covered with an insulator adhered to the faces of the notches so that the stator coils are not in contact with the faces of the notches.

The purpose of the invention is to overcome all or part of these disadvantages.

DESCRIPTION OF THE INVENTION

In view of the above, the object of the invention is an electrical insulating element for a stator comprising a stack of magnetic sheets having at least one first stator tooth and comprising at least one first stator coil wound around the first stator tooth, the first stator tooth having a first end face located at one end of the stack of magnetic sheets, the insulating element comprising an electrically insulating foil having a face coated with adhesive.

The insulating element is configured to be inserted between the first face of the first stator tooth and the stator coil, the adhesive-coated face being adhered to the first face.

The insulating element obtained from an electrically insulating foil and adhered to the first stator tooth deforms during compaction of the coil so that it does not tear, allowing to increase the compaction pressure of the coil to reduce the size of the stator and improve the electrical insulation of the coil compared to the stack of magnetic sheets.

The thickness of the insulating element equal to the thickness of the electrically insulating foil is constant for the entire insulating element allowing better control of the insulation thickness.

Furthermore, no element of the insulating element is likely to damage a rotating electric machine.

Preferably, the U-shaped insulating element is obtained by folding the insulating foil and configured to be fitted in a longitudinal direction of the stator on the first stator tooth so that the insulating element is further inserted between the first stator coil and side faces of the first stator tooth, the adhesive-coated face being configured to be adhered to the side faces of the first stator tooth.

Advantageously, the insulating element is further configured to be inserted between the first stator coil and at least one side surface of a notch delimited by the first stator tooth and a second stator tooth of the stack of magnetic sheets adjoining the first stator tooth, the side surface of the notch extending between a side face of the first stator tooth and a side face of the second stator tooth adjoining the first stator tooth, the adhesive-coated face being further adhered to the side face of the notch.

Preferably, the stack of magnetic sheets further includes a second stator tooth, the stator comprising a second stator coil wound around the second stator tooth, the insulating element being further configured to be inserted between the first end face of the second stator tooth and the second stator coil wound around the second stator tooth.

A stator is also proposed comprising a stack of magnetic sheets including at least a first stator tooth, at least one stator coil wound around the first stator tooth and a U-shaped insulating element as defined previously, the first stator tooth having a first end face located at one end of the stack of magnetic sheets, the adhesive-coated face being adhered to the first face, the insulating element being inserted between the first face and the stator coil.

Preferably, the stator further comprises a second U-shaped insulating element as defined previously, the first stator tooth including a second end face located at the other end of the stack of magnetic sheets, the adhesive-coated face of the second insulating element being adhered to the second face, the second insulator being inserted between the second face and the stator coil.

Advantageously, the insulating element is U-shaped, said insulating element is fitted in a longitudinal direction of the stator on the first stator tooth so that the insulating element is further inserted between the stator coil and side faces of the first stator tooth, the adhesive-coated face of said insulating element being further adhered to the side faces of the first stator tooth.

Preferably, the stack of magnetic sheets further includes a second stator tooth adjoining the first stator tooth, the first and second stator teeth defining a notch including at least one side surface extending between a side face of the first stator tooth and a side face of the second stator tooth adjoining the side face of the stator tooth, the U-shaped insulating element is further inserted between the side surface of the notch and the stator coil, the adhesive-coated face being further adhered to the side face of the notch.

A rotating electric machine comprising a stator as defined above is also proposed.

A sensor comprising a stator as defined above is also proposed.

An aircraft comprising at least one rotating electric machine as defined above or at least one sensor as defined above is also proposed.

BRIEF DESCRIPTION OF THE DRAWINGS

Other purposes, features and advantages of the invention will appear upon reading the following description, given only by way of non-limiting example, and made with reference to the appended drawings wherein:

FIG. 1 schematically illustrates an aircraft according to the invention;

FIG. 2 schematically illustrates an example of a stator according to the invention;

FIG. 3

FIG. 4 schematically illustrate a first embodiment of the electrically insulating element according to the invention;

FIG. 5 schematically illustrates a second example of the stator according to the invention;

FIG. 6

FIG. 7 schematically illustrate a second embodiment of the electrically insulating element according to the invention;

FIG. 8 schematically illustrates an example of a method for obtaining the stator according to the invention, FIG. 9 schematically illustrates a third example of the stator according to the invention, and FIG. 10 schematically illustrates a sensor according to the invention.

DETAILED DESCRIPTION OF AT LEAST ONE EMBODIMENT

Reference is made to FIG. 1 which schematically illustrates an aircraft 1 comprising a rotating electric machine 2 including a wound stator 3 having a central axis A and a rotor 4 disposed in the stator 3.

FIG. 2 illustrates an example of the stator 3.

The stator 3 comprises a stack 5 of magnetic sheets including stator teeth 6.

Each stator tooth 6 has a first end face 7 located at one end of the stack 5 of magnetic sheets, and a second end face 8 located at the other end of the stack 5 of magnetic sheets.

Two adjoining teeth 6 delimit a notch E.

The stator 3 further comprises stator coils 9 each wound around a different stator tooth 6 and notch wedges 16 each held by the free ends of two adjoining stator teeth 6.

The notches E house the coils 9.

In order to simplify the representation of the stator 3, only a coil 9 wound around a tooth 6 is shown.

The stator 3 further comprises electrical insulating elements 10 each comprising an electrically insulating foil having a face coated with adhesive.

The electrically insulating foil comprises, for example, aramid paper.

The adhesive is, for example, glue.

An insulating element 10 is inserted between the first end face 7 of each stator tooth 6 and the coil 9 wound around said tooth 6.

Another insulating element 10 is inserted between the second end face 8 of each stator tooth 6 and the coil 9 wound around said tooth 6.

The adhesive-coated face of each insulating element 10 is adhered to one of the first or second end faces 7, 8 of the stator tooth 6.

FIGS. 3 and 4 illustrate a first embodiment of the U-shaped insulating element 10 obtained by folding the electrically insulating foil and a pattern of the unfolded insulating element 10.

The insulating element 10 comprises two extensions 11, 12 connected to a base 13 forming a jumper.

The two extensions 11, 12 are separated by a distance D equal to the width of the base 13 and equal to the thickness of the stator tooth 6 in a circumferential direction of the stack 5 of magnetic sheets.

The insulating element 10 is fitted in a longitudinal direction of the stator 3 on the stator tooth 6 so that the base 13 is adhered to one of the first and second end faces 7, 8 of the stator tooth 6, and so that the two extensions 11, 12 are adhered to the side faces of the stator tooth 6.

The length L of the base 13 is selected so that the coil 9 is not in contact with the first or second end face 7, 8 of the stator tooth 6.

The height H of the two extensions 11, 12 is for example selected so that when two insulating elements 10 are disposed on a tooth 6, the coil 9 is not in contact with the side faces of said tooth.

FIG. 5 illustrates a second example of the stator 3 including a second embodiment of the insulating element 10.

FIGS. 6 and 7 illustrate an example of the second embodiment of the insulating element 10 and a pattern of the unfolded insulating element 10.

The insulating element 10 further comprises wings 14, 15 connected to a first extension 11.

Alternatively, the wings 14, 15 are connected to the second extension 12 or each wing 14, 15 is connected to a different extension 11, 12.

A first wing 14 is adhered to a first side surface of the notch E extending at the foot of the teeth 6 between two side faces facing each other of two adjoining stator teeth 6.

The second wing 15 is adhered to a second side surface of the notch E extending at the free end of the teeth 6 between two side faces facing each other of two adjoining stator teeth 6.

The second wing 15 is adhered to the notch wedge 16.

The lengths L1 and L2 of the first and second wings 14, 15 are selected so that the coils 9 are not in contact with the first and second surfaces of the notch E.

FIG. 8 illustrates an example of a method for obtaining the stator 3.

During a step 20, the patterns of the insulating elements 10 are cut from the electrically insulating foil.

Then during a step 21, the insulating elements 10 are fitted on the teeth 6 and adhered to the teeth 6.

If the insulating elements 10 further include the wings 14, 15, the wings 14, 15 are adhered to the side surfaces of the notches E and the notch wedges 16.

If the insulating elements 10 do not include the wings 14, 15, an electrical insulator is applied to the side surfaces of the notches E. The electrical insulator includes, for example, a varnish.

Alternatively, no electrical insulation is applied to the side surfaces of the notch E, the electrical insulation being provided only by the sheath of the wires forming the stator coils.

During a step 22, when the insulating elements 10 are adhered, the coils 9 are wound around the teeth 6.

Then, during a step 23, the coils 9 are compressed in order to reduce the height along the axis A of the stator 3.

The electrical insulation of each coil 9 relative to the stack 5 of sheets is controlled.

As the insulating elements 10 are obtained from an electrically insulating foil and are adhered to the teeth 6, the insulating elements 10 deform when the coils 9 are compressed so that they do not tear, allowing the compression pressure of the coils 9 to be increased to reduce the size of the stator 3.

As the insulating elements 10 do not tear, the electrical insulation of each coil 9 relative to the stack 5 of sheets is improved.

The thickness of the insulating element 10 equal to the thickness of the electrically insulating foil is constant for the entire insulating element 10 allowing better control of the insulation thickness.

Furthermore, no element likely to damage the rotating electric machine 2 during the rotation of the rotor 4 becomes detached from the insulating elements 10.

The insulating elements 10 are produced by cutting and folding a pattern in electrically insulating foils so that they do not require the implementation of industrial infrastructures requiring protective measures for operators, such as the implementation of ovens, powder projection devices facilitating and reducing the time required to insulate the coils 9 from the stack of sheets.

The insulating elements 10 according to the first embodiment allow to electrically insulate the coils 9 from the end faces of the teeth 6, from the side faces of the teeth 6 and from the edges of the end faces of the teeth 6.

The insulating elements 10 according to the second embodiment further allow to electrically insulate the coils 9 from the side faces of the notches E.

FIG. 9 illustrates a third example of the stator 3 including a third embodiment of the insulating element 10.

In this embodiment, the insulating element 10 comprises designs 30 cut from the electrically insulating foil of the insulating element 10 and connected together so that each design covers one of the first or second end faces 7, 8 of the stator tooth 6.

The electrical insulation of one of the first or second end faces 7, 8 of the stator teeth 6 relative to the coils 9 is carried out by a single insulating element 10.

According to another embodiment of the stator 3 which is not shown, one of the first or second end faces 7, 8 of each tooth 6 is electrically insulated from the coil 9 by an insulating element 10 according to one of the first, second or third embodiment, and the other end face 8, 7 is electrically insulated from the coil 9 by an insulating element according to another embodiment among the first, second and third embodiment of the insulator element 10 allowing a variety of embodiments of the insulating element 10.

According to another embodiment, the stator 3 is implemented in a sensor 20, for example of the resolver type (shown in FIG. 10).

Sine, cosine and excitation coils are wound around the teeth 6 and electrically insulated from the teeth 6 by at least one insulating element 10.

The invention claimed is:

1. An electrical insulating element for a stator comprising a stack of magnetic sheets having at least one first stator tooth and comprising at least one first stator coil wound around the stator tooth, the first stator tooth having a first end face located at one end of the stack of magnetic sheets, the insulating element comprising an electrically insulating foil having a face coated with adhesive, the insulating element being configured to be inserted between the first face of the first stator tooth and the first stator coil, the face coated with adhesive being adhered to the first face, characterized in that the insulating element is U-shaped obtained by folding the insulating foil and configured to be fitted in a longitudinal direction of the stator on the first stator tooth so that the insulating element is further inserted between the first stator coil and side faces of the first stator tooth, the adhesive-coated face being configured to be adhered to the side faces of the first stator tooth, the insulating element being in one piece and made exclusively from the electrically insulating foil.

2. The insulating element according to claim 1, being further configured to be inserted between the first stator coil and at least one side surface of a notch delimited by the first stator tooth and a second stator tooth of the stack of magnetic sheets adjoining the first stator tooth, the side surface of the notch extending between a side face of the first stator tooth and a side face of the second stator tooth adjoining the first stator tooth, the adhesive-coated face being further adhered to the side face of the notch.

3. A stator comprising a stack of magnetic sheets having at least one first stator tooth, at least one stator coil wound around the first stator tooth and an electrical insulating element according to claim 1, the first stator tooth having a first end face located at one end of the stack of magnetic sheets, the adhesive-coated face being adhered to the first face, the insulating element being inserted between the first face and the stator coil.

4. The stator according to claim 3, further comprising a second insulating element according to claim 1, the first stator tooth including a second end face located at the other end of the stack of magnetic sheets, the adhesive-coated face of the second insulating element being adhered to the second face, the second insulator being inserted between the second face and the stator coil.

5. The stator according to claim 3, wherein the insulating element is fitted in a longitudinal direction of the stator on the first stator tooth so that the insulating element is further inserted between the stator coil and side faces of the first stator tooth, the adhesive-coated face of said insulating element being further adhered to the side faces of the first stator tooth.

6. The stator according to claim 5, wherein the stack of magnetic sheets further includes a second stator tooth adjoining the first stator tooth, the first and second stator teeth defining a notch including at least one side surface extending between a side face of the first stator tooth and a side face of the second stator tooth adjoining the side face of the stator tooth, the U-shaped insulating element is further inserted between the side surface of the notch and the stator coil, the adhesive-coated face being further adhered to the side face of the notch.

7. A rotating electric machine comprising a stator according to claim 3.

8. An aircraft comprising at least one rotating electric machine according to claim 7.

9. A sensor comprising a stator according to claim 3.

10. An aircraft comprising at least one sensor according to claim 9.

* * * * *